United States Patent

[11] 3,633,035

[72] Inventors Teiji Uchida; Motoaki Furukawa, both of Tokyo, Japan
[21] Appl. No. 876,357
[22] Filed Nov. 13, 1969
[45] Patented Jan. 4, 1972
[73] Assignee Nippon Selfoc Company, Limited, c/o Nippon Electric Company, Limited Tokyo, Japan
[32] Priority Nov. 16, 1968
[33] Japan
[31] 43/83674

[54] MULTIPLEXED OPTICAL COMMUNICATIONS SYSTEM
3 Claims, 3 Drawing Figs.

[52] U.S. Cl. .......... 250/199, 350/96 B, 350/169, 350/175 BN
[51] Int. Cl. .......... H04b 9/00
[50] Field of Search .......... 250/199, 227; 350/96 B, 96 WG, 156, 169; 178/6, DIG. 2

[56] References Cited

UNITED STATES PATENTS

| | | | |
|---|---|---|---|
| 2,506,672 | 5/1950 | Kell et al. | 178/DIG. 2 |
| 3,434,774 | 3/1969 | Miller | 350/96 |
| 3,532,890 | 10/1970 | Denton | 250/199 |

OTHER REFERENCES

Miller, S. E. " Light Propagation in Generalized Lens-Like Media" ; Bell System Technical Journal, Nov. 1965, pp. 2,017- 2,023

*Primary Examiner*—Benedict V. Safourek
*Attorney*—Sandoe, Hopgood and Calimafde

ABSTRACT: A multiplexed optical communications system comprises a plurality of fibrous light guide elements which receive respective ones of a plurality of modulated light beam sources having predetermined phase differences therebetween. The output ends of the elements are formed into a bundle which communicates with one end of a light transmission path. Means positioned at the other end of the transmission path are provided for separating the modulated signals in accord with their respective phase separations.

INVENTORS
Teiji Uchida
Motoaki Furukawa
by
Sandoe, Hopgood & Calimafde
ATTORNEYS

MULTIPLEXED OPTICAL COMMUNICATIONS SYSTEM

This invention relates generally to optical communications systems, and more particularly to a multiplexed optical communications system utilizing a laser light beam.

In one previously proposed multiplexed optical communications system, two linearly polarized light beams having mutually perpendicular planes of polarization are transmitted from a transmitting site in the form of a single light beam synthesized from these beams by means of a first birefringent prism, which at a receiving site is again separated into two light beams by means of a second birefringent prism.

However, in this system the number of optical beams to be multiplexed is restricted because the transmission of numerous light beams having identical planes of polarization is quite difficult.

In copending U.S. application Ser. No. 806,368, now abandoned there is described a fiberlike transparent element having a refractive index distribution observed in the cross section perpendicular to its longitudinal axis which is greatest at the axis and decreases toward the surface substantially in proportion to the square of the radial distance from the axis. More precisely, the refractive index $n$ at a radial distance $r$ measured from the axis of the element is given by $$n=n_0\left(1-\frac{a}{2}r^2\right) \qquad (1)$$

where $n_0$ denotes the refractive index at the axis of the element and $a$ is a constant.

According to an article by S. E. Miller published on pages 2,017 to 2,064 of "The Bell System Technical Journal," Vol. 44, No. 9 (Nov. 1965), a light beam with a suitable spot size in its cross section incident upon one end of a fiber element of this type is transmitted therethrough in the axial direction oscillating about the axis, without being reflected at its internal surface and without substantial divergence, and finally emerges from the output end surface with the same mode and same spot size as the incident beam. In other words, a medium of this kind contains the converging property. As regards a laser light beam of the fundamental mode of oscillation incident upon one end surface of the fibrous converging element, a specific spot size is given by $$\left(\frac{\lambda 0}{\pi n_0}\right)^{\frac{1}{2}}\cdot a^{-\frac{1}{4}}$$

assuming that the laser light beam of the fundamental mode is made incident at a suitable angle upon the converging element having the refractive index distribution defined by equation (1), where $\lambda_o$ is the light wavelength in free space. A fiberlike transparent element having the refractive index distribution defined by equation (1) is referred to herein as a fibrous converging light guide.

If a number of light beams are made incident upon the input end surface of the fibrous converging light guide in such manner that at least either incident point or incident angle of each beam is mutually different, each beam will emerge from the light guide with a mutually different emerging point and/or angle.

A multiplexed optical communication system employing the above-mentioned characteristics of the fibrous converging light guide is disclosed in copending U.S. application Ser. No. 839,267, filed in the name of Uchida et al. on July 7, 1969.

The multiplexed optical communication system described in the last-mentioned copending application comprises a fibrous converging light guide forming at least a part of a transmission path for said communication system. Means are provided for making a plurality of coherent light beams, each modulated by a modulating signal to be transmitted, incident upon one end surface of the light guide with specific phase differences being maintained between said light beams. The coherent light beams emanating from the other end surface of said light guide are detected to reproduce the modulating signals, and means are provided for separating the modulating signals in response to the specific phase difference.

Another embodiment of a multiplexed optical communication system described in said last-mentioned copending application comprises a fibrous converging light guide for making a plurality of light beams incident upon a transmitting optical antenna system along with means for making a plurality of coherent light beams, respectively modulated with modulating signals, incident upon one end surface of the light guide with specific phase differences maintained between said signals. A transmitting optical antenna system is provided for transmitting into the transmission medium said modulated light beams emerging from the other end surface of said light guide and a receiving optical antenna receives light beams transmitted form said transmitting antenna. Means are coupled to the receiving antenna for detecting said modulating signals from the modulated light beams, and means are provided for separating the modulating signals in response to the specific phase difference.

However, a conventional optical lens system is too large to be employed as the means for making a plurality of light beams incident upon one end surface of the light guide. When the diameter of the light guide is small and the incident angle is larger than a certain threshold value, the transmission of the incident light beams through the light guide is practically impossible. Therefore, if a conventional lens system is used as the input to the guide, the number of light beams which can be multiplexed is limited.

It is thus an object of the present invention to provide a novel, highly multiplexed optical communication system free from the above-mentioned difficulties.

It is another object of the present invention to provide an improved input means for light transmission paths in an optical communications system.

It is a further object of the present invention to provide an improved optical communications system in which the number of laser light beams that can be multiplexed can be increased.

To these ends, the multiplexed optical communication system of the present invention comprises a plurality of modulated light beam sources respectively modulated by the modulating signals with a specific phase difference maintained between said signals, and a plurality of fibrous converging light guide elements, each having a refractive index distribution observed in its cross section which is greatest on its longitudinal axis and decreases toward its surface substantially in proportion to the square of the distance from said axis. A light transmission path is provided for transmitting light beams along with means for detecting the modulating signals from the modulated light beams transmitted through said transmission path. The modulated signals are separated in response to the specific phase difference, wherein the output end surfaces of the fibrous light guide element are disposed at the input end of the transmission path in a manner such that they are mutually close to each other so as to form a bundle.

Since a flexible fibrous converging light guide is employed in the present invention for operatively connecting each modulated light beam source and the transmission path, the light beam from each light source is reliably guided to the incident point of the light transmission path, even if a great number of light beams is used and the light sources are mutually disposed remote from that point. As a result, the multiplexing of a larger number of optical signals is made possible. In other words, the present invention provides a highly multiplexed optical communication system which cannot be attained by the conventional systems using the prior art input means.

To the accomplishment of the above and to such further objects as may hereinafter appear, the present invention relates to a multiplexed optical communications system as defined in the appended claims and as described in the following specification, taken in conjunction with the accompanying drawings, in which:

Figure 1:
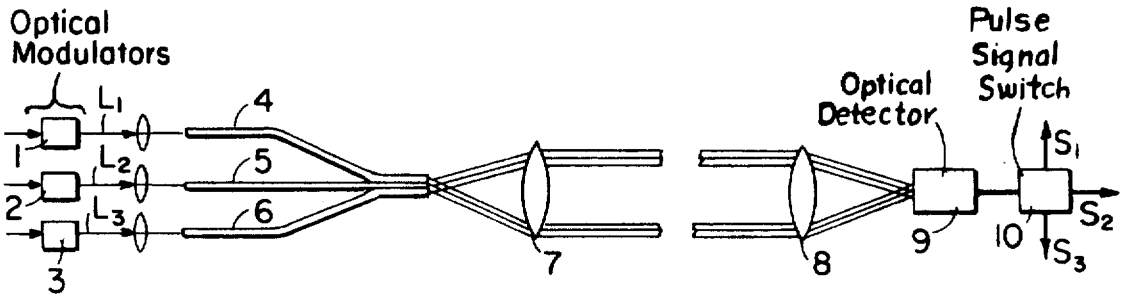
FIG. 1 is a schematic diagram in block form illustrating an embodiment of the optical communications system of the present invention.

FIG. 1 illustrates a system according to the present invention where the light pulse supplied from each light source is emitted into the atmosphere. The light sources are respectively incident upon the optical modulators 1, 2 and 3, whose output modulated light pulse trains L1, L2 and L3 are applied respectively to the input ends of fibrous light guides 4, 5 and 6 through a suitable lens system. Optical modulators 1, 2 and 3 may be of any known design such as a polarization-plane-rotating means and analyzer as is well known to those in the optical field. The fibrous light guides are of the converging type and have a radial distribution of index of refraction as defined in equation (1) above. Namely, the index of refraction in these guides is greatest along the axis and decreases in accord with the square of the radial distance from the axis. A complete description of the optical material is provided in copending application, Ser. No. 806,368, now abandoned and is therefore not further described herein.

Figure 2:
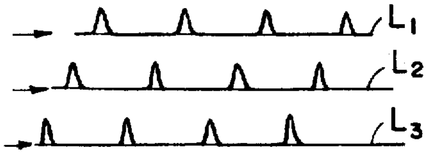
FIG. 2 is a waveform diagram for explaining the relation of the light pulses in each channel of the system of FIG. 1.

In operation, each carrier light beam incident upon the optical modulators 1, 2 and 3 is modulated therein upon the end surface of each of the fibrous converging light guides 4, 5 and 6 with a specific spot size as defined by the equation in the above-referenced Miller article. The circuits preceding the fibrous converging light guides 4, 5 and 6 are constructed in such manner that the modulated light pulse trains $L_1$, $L_2$ and $L_3$ contain the predetermined mutual phase differences, as shown in FIG. 2, at the input surfaces of the fibrous converging light guides 4, 5 and 6. When the length of each of the fibrous converging light guides 4, 5 and 6 is equal to $N\pi/\sqrt{a}$, where $N$ is an integer, a light beam, incident upon the input end surface of each light guide in parallel with the axis of the light guide, emerges from another end surface in a direction parallel to the axis. A plurality of light beams, emitted from the output surface of the light guide in the same direction as the input with respect to the longitudinal axis, with small spacing respectively retained with respect to one another, are converted to an electrical pulse by the optical detector 9 after passing through optical systems 7 and 8. That electrical pulse is then separated into the electrical pulse trains $S_1$, $S_2$ and $S_3$ by the electrical pulse signal switch 10 which may be, for example, an electronic rotary switch.

The light pulse signals incident upon the fibrous converging light guides 4, 5 and 6 must contain the specific mutual phase difference therebetween. Also, when the length of the fibrous converging light guides 4, 5 and 6 is selected to be $(2N+1)\pi/2\sqrt{a}$, the light beam incident upon one of the end surfaces of the guide 4 or 5 or 6 in a direction forming a certain angle with the axis which is smaller than the threshold angle range peculiar to the light guide, emerges from the output end surface in a direction parallel to the axis. A plurality of such output light beams after passing through optical systems 7 and 8 can be separated into the electrical pulse trains $S_1$, $S_2$ and $S_3$, as described above.

In addition, according to the present invention, fibrous converging light guide elements having lengths of either $(2N+1)\pi/2\sqrt{a}$ or $N\pi/\sqrt{a}$ can be used in combination with one another in a manner such that a light beam is made incident upon one of the end surfaces of the light guide of a length $(2N+1)\pi/2\sqrt{a}$ in a direction forming a certain angle with the axis, and that another light beam is made incident upon one of the end surfaces of the light guide of its length $N\pi/\sqrt{a}$ in a direction parallel to the axis. In this case the output light beams emerge from the output end surfaces of the light guides in a direction parallel to the axis. Other modifications can be made to the system of FIG. 1 using this concept.

Figure 3:
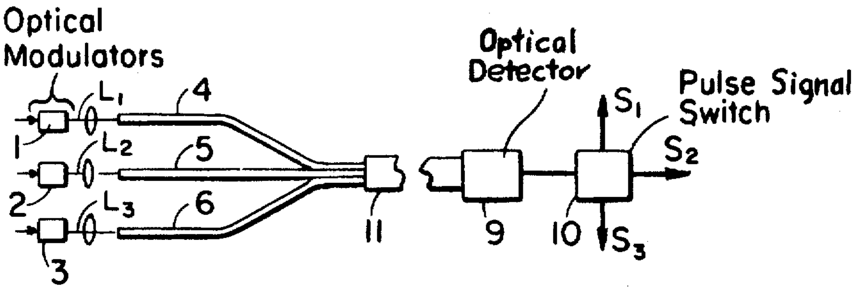
FIG. 3 is a schematic diagram in block form illustrating another embodiment of the present invention.

Referring to FIG. 3, which shows another embodiment of the present invention, a relatively thick fibrous converging light guide 11 is used instead of the optical systems 7 and 8 as employed in the system of FIG. 1. The cross-sectional area of light guide 11 is chosen to be as large as the sum of the areas of the cross sections of the fibrous converging light guide elements 4, 5 and 6 connected to the input end surface of light guide 11. In this case, it is sufficient only to arrange the construction in such a manner that the light beam incident upon the light guide 11 arrives at a predetermined point of optical detector 9. Therefore, parallel incidence of the light beams upon the input end surface of light guide 11 is not necessary. Accordingly, the transmission and reception of the modulated light beams can be realized without limiting the lengths of the fibrous converging light guide elements 4, 5 and 6 connected to the light guide 11. Although the light pulse signals incident upon one of the end surfaces of each of the light guide elements 4, 5 and 6 are given the specific mutual phase differences as shown in FIG. 2, these phase differences are not indispensable, because the transmission path is composed of the fibrous converging light guide 11. More precisely, since the light paths in the transmission path for the modulated light beams are mutually different from each other, each modulated light beam can be separated by the corresponding optical detector, from which the signals $S_1$, $S_2$ and $S_3$ are derived by the detector.

Although the above explanation is given of an application of the present invention in which three modulated light beams, that is, three optical signals, are multiplexed, it is obvious that the multiplexing of a number of optical signals more than three is possible.

Thus, while only several embodiments of the present invention have been herein specifically disclosed, it will be apparent that variations may be made therein without departure from the spirit and scope of the invention.

We claim:

1. A multiplexed optical communication system comprising a plurality of coherent light beam sources for producing light beams each in the form of a light pulse train having a substantially equal predetermined repetition rate, means disposed in the light paths of said light beam for respectively ON-OFF modulating said light pulse sources in response to pulsed information signals to be transmitted, a light transmission path for transmitting the modulated light beams, a plurality of thin fibrous converging light guide elements for optically coupling said modulating means to said light transmission path, one end of each of said light guide elements being disposed facing said modulating means in one-to-one correspondence, the other ends of each of said light guide elements being arranged in a bundle with their optical axes being substantially aligned with that of the input end portion of said transmission path, each of said light guide elements having a refractive index distribution which is greatest along its longitudinal axis and which decreases monotonically toward its surface substantially in proportion to the square of the radial distance from said axis and having a cross section much smaller than the aperture of said input end portion of said transmission path, and means for receiving the modulated light beams transmitted through said transmission path and for detecting said pulsed information signals from the received light beams separately one from another, said modulating means including means for providing a predetermined phase relationship between the light pulse trains of said light beams, the lengths of said light guide elements being different from one another to provide a different retardation to the respective light beams, thereby to produce time-division-multiplexed light pulse trains at the bundled end of said light guide elements, whereby said modulated light pulse trains travel through said transmission path in a time-division multiplexed fashion.

2. The multiplexed optical communication system as claimed in claim 1, wherein said light transmission path comprises a lens system and the atmosphere.

3. The multiplexed optical communication system as claimed in claim 2, wherein said light transmission path comprises a long-distance light guide element having a cross section greater than that of said fibrous light guide elements and having a refractive index distribution similar to the latter.

* * * * *